117,181

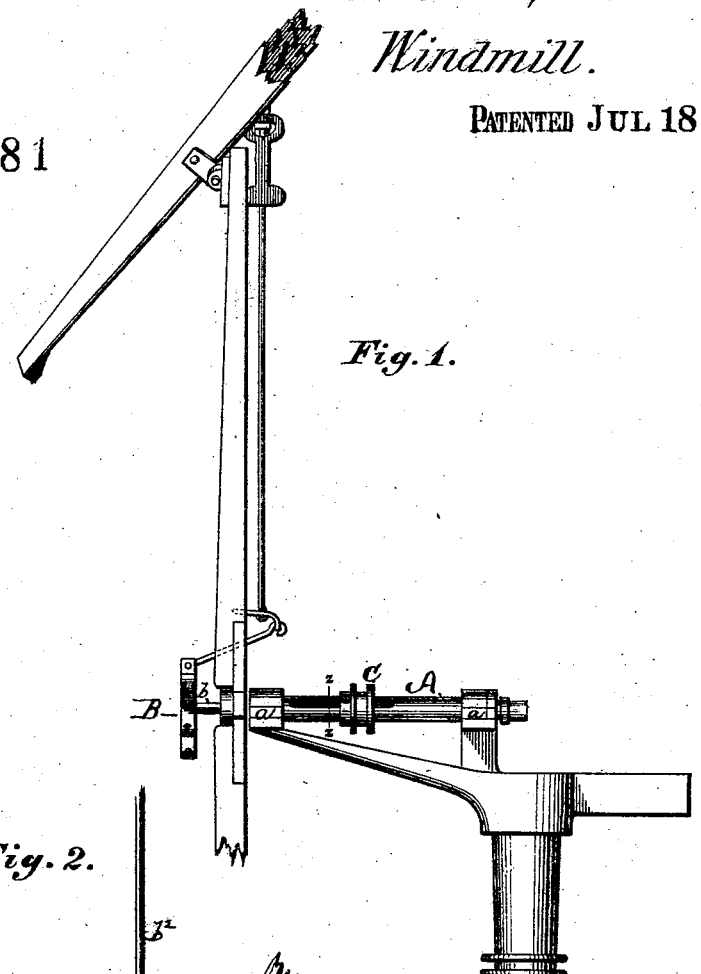
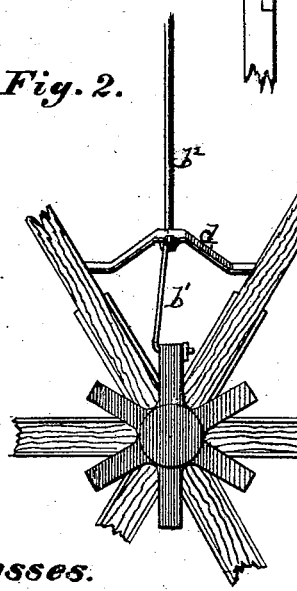
T. C. Little,
Windmill.
No. 117181 Patented Jul 18 1871

UNITED STATES PATENT OFFICE.

THOMAS C. LITTLE, OF DIXON, ILLINOIS.

IMPROVEMENT IN WINDMILLS.

Specification forming part of Letters Patent No. 117,181, dated July 18, 1871.

*To all whom it may concern:*

Be it known that I, THOMAS C. LITTLE, of Dixon, in the county of Lee and State of Illinois, have invented a new and useful Improvement in Windmills; and I do hereby declare that the following is a full and exact description of the same, reference being had to the accompanying drawing and to the letters of reference marked thereon.

This invention relates to that class of windmills which is provided with a sliding head for adjusting the position of the sails of the mill; and consists of certain details of construction, which will be fully described hereinafter.

In the drawing, Figure 1 represents a side elevation of a portion of a windmill. Fig. 2 is a front elevation, and Fig. 3 a central sectional elevation.

To enable others skilled in the art to make and use my invention, I will now proceed to describe fully its construction and manner of operation.

A represents the main shaft of the mill, consisting of a tube or hollow cylinder supported in any proper bearings, $a\ a$, as shown. B represents the slide-head, which is constructed in any proper manner and rigidly secured to the rod $b$, as shown. C represents a grooved collar or sleeve, which is also rigidly secured to the rod $b$, connection between the two being made by means of screws or pins projecting through longitudinal slots in the shaft A, as represented in the drawing. The slide-head B is connected by rods $b^1$ to the bent bars $d$, which latter are pivoted between the radial arms of the mill and are themselves connected to the cross-bars of the sets of the sails by rods $b^2$, as shown. The grooved collar C is connected in any proper manner to the governing device, and also, if desired, to the controlling lever.

The described construction is exceedingly simple and yet effective in operation.

Having thus fully described my invention, what I claim as new, and desire to secure by Letters Patent, is—

1. The combination of the hollow shaft A with the rod $b$ of the slide-head B and the collar C, as described, the collar being rigidly united to the rod $b$ by means of pins or screws moving in the slot of shaft A, as described.

2. The combination of the elements of the first claim with the bent bar $d$ and its connecting-rods, as described.

This specification signed and witnessed this 2d day of June, 1871.

THOMAS C. LITTLE.

Witnesses:
 G. W. FORD,
 D. LAMONT.